United States Patent
Lee et al.

(10) Patent No.: US 8,205,198 B2
(45) Date of Patent: Jun. 19, 2012

(54) SYSTEM AND METHOD FOR MONITORING A WORKFLOW PROCESS AND GENERATING REMINDER ALERTS USING MODULAR ARITHMETIC

(75) Inventors: Chung-I Lee, Taipei Hsien (TW); Hai-Hong Lin, Shenzhen (CN); De-Yi Xie, Shenzhen (CN); Chen-Chen Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1265 days.

(21) Appl. No.: 11/933,434

(22) Filed: Nov. 1, 2007

(65) Prior Publication Data
US 2008/0141254 A1 Jun. 12, 2008

(30) Foreign Application Priority Data
Dec. 6, 2006 (CN) .......................... 2006 1 0157339

(51) Int. Cl.
*G06F 9/46* (2006.01)
*G06Q 90/00* (2006.01)
(52) U.S. Cl. ...... 718/100; 705/7.12; 705/7.13; 705/7.19
(58) Field of Classification Search ........................ None
See application file for complete search history.

(56) References Cited

U.S. PATENT DOCUMENTS

| | | | |
|---|---|---|---|
| 7,069,536 B2 | 6/2006 | Yaung | |
| 2002/0023117 A1* | 2/2002 | Bernardin et al. | 709/104 |
| 2003/0018507 A1* | 1/2003 | Flanagan | 705/8 |
| 2003/0067920 A1* | 4/2003 | Rezaiifar et al. | 370/394 |
| 2003/0214997 A1* | 11/2003 | Diekmann et al. | 374/102 |
| 2004/0068424 A1* | 4/2004 | Lee et al. | 705/7 |
| 2004/0093351 A1* | 5/2004 | Lee et al. | 707/104.1 |
| 2004/0193648 A1* | 9/2004 | Lai et al. | 707/104.1 |
| 2005/0050480 A1* | 3/2005 | Katla et al. | 716/1 |
| 2005/0055264 A1* | 3/2005 | Gallick et al. | 705/9 |
| 2005/0060070 A1* | 3/2005 | Kapolka et al. | 701/29 |
| 2005/0234758 A1* | 10/2005 | Nishi | 705/8 |
| 2008/0141247 A1* | 6/2008 | Saravanan | 718/100 |

\* cited by examiner

*Primary Examiner* — Meng An
*Assistant Examiner* — Benjamin Wu
(74) *Attorney, Agent, or Firm* — Altis Law Group, Inc.

(57) ABSTRACT

An exemplary method for controlling a workflow is provided. The method includes: setting a check-status schedule and a reminder timer for each task of the workflow process; checking whether any task of the workflow process is in an incomplete state according to the check-status schedule; obtaining an operator name and a task assigned time of the task remained in the incomplete state; calculating a time difference between a current time and the task assigned time and calculating a remainder by utilizing modular arithmetic; and generating an alarm signal and sending the alarm signal to inform a corresponding operator to perform the task remained in the incomplete state if the remainder is greater than zero and not greater than the check-status schedule. A related system is also provided.

5 Claims, 3 Drawing Sheets

SYSTEM AND METHOD FOR MONITORING A WORKFLOW PROCESS AND GENERATING REMINDER ALERTS USING MODULAR ARITHMETIC

BACKGROUND OF THE INVENTION

1. Field of the Invention

The present invention relates to systems and methods for monitoring a workflow process, and more particularly to a system and method for monitoring a workflow process by generating an alarm signal.

2. Description of Related Art

Workflow is generally defined as a series of tasks within an organization to produce a final result. In particular, workflow, as defined by a workflow management system, is the automation of a business process, whether in full automation or partial automation, documents, information, and/or tasks are passed from one procedure to another according to a set of procedural rules. That is, a workflow defines a serial of procedures to be performed by one operator or more operators. The procedures may include updating an electronic form, reviewing information, etc. After the operator performs the procedure, yielded product or other information is then routed according to a next procedure. For instance, processing an on-line product purchase may involve numerous steps, such as receiving a customer order, routing the customer order to the credit department to produce an invoice and then routing the customer order to the shipment department to prepare product shipment. Once the product shipment is prepared, the product shipment and the invoice are then transferred to the customer service department for other procedures. Each of these procedures may be defined as a task in a workflow. When a prior task is not completed, a next task cannot be performed, thus, affecting the next task.

What is needed, therefore, is a system and method for controlling a workflow process, which can query data of the workflow process and generate an alarm signal for informing an operator to perform an incomplete task of the workflow process.

SUMMARY OF THE INVENTION

A system for controlling a workflow is configured in an application server. The application server is connected to a database. The database is configured for storing task status, an operator name, and a task assigned time of each task of the workflow process. The application server includes a setting module, a checking module, an obtaining module, a calculation module and an alert module. The setting module is configured for setting a check-status schedule and a reminder timer for each task of the workflow process, and recording the check-status schedule and the reminder timer into the database. The checking module is configured for determining whether any task of the workflow process is in an incomplete state by checking task status of each task of the workflow process according to the check-status schedule. The obtaining module is configured for obtaining from the database the operator name and the task assigned time of the task remained in the incomplete state. The calculation module is configured for calculating a time difference between a current time and the task assigned time of the task remained in the incomplete state if the current time is within the check-status schedule, and calculating a remainder after the time difference being divided by the reminder timer by utilizing modular arithmetic. The alerting module is configured for generating an alarm signal and sending the alarm signal to inform a corresponding operator to perform the task remained in the incomplete state if the remainder is greater than zero and not greater than the check-status schedule.

A computer-enabled method for controlling a workflow includes: setting a check-status schedule and a reminder timer for each task of the workflow process; checking whether any task of the workflow process is in an incomplete state according to the check-status schedule if a current time is time to check for each task of the workflow process; obtaining an operator name and a task assigned time of the task remained in the incomplete state; calculating a time difference between the current time and the task assigned time and calculating a remainder after the time difference being divided by the reminder timer by utilizing modular arithmetic; determining whether the remainder is greater than zero and not greater than the check-status schedule; and generating an alarm signal and sending the alarm signal to inform a corresponding operator to perform the task remained in the incomplete state if the remainder is greater than zero and not greater than the check-status schedule.

Other novel features of the indicated invention will become more apparent from the following detailed description of the preferred embodiment when taken in conjunction with the accompanying drawings.

DETAILED DESCRIPTION OF THE INVENTION

Figure 1:
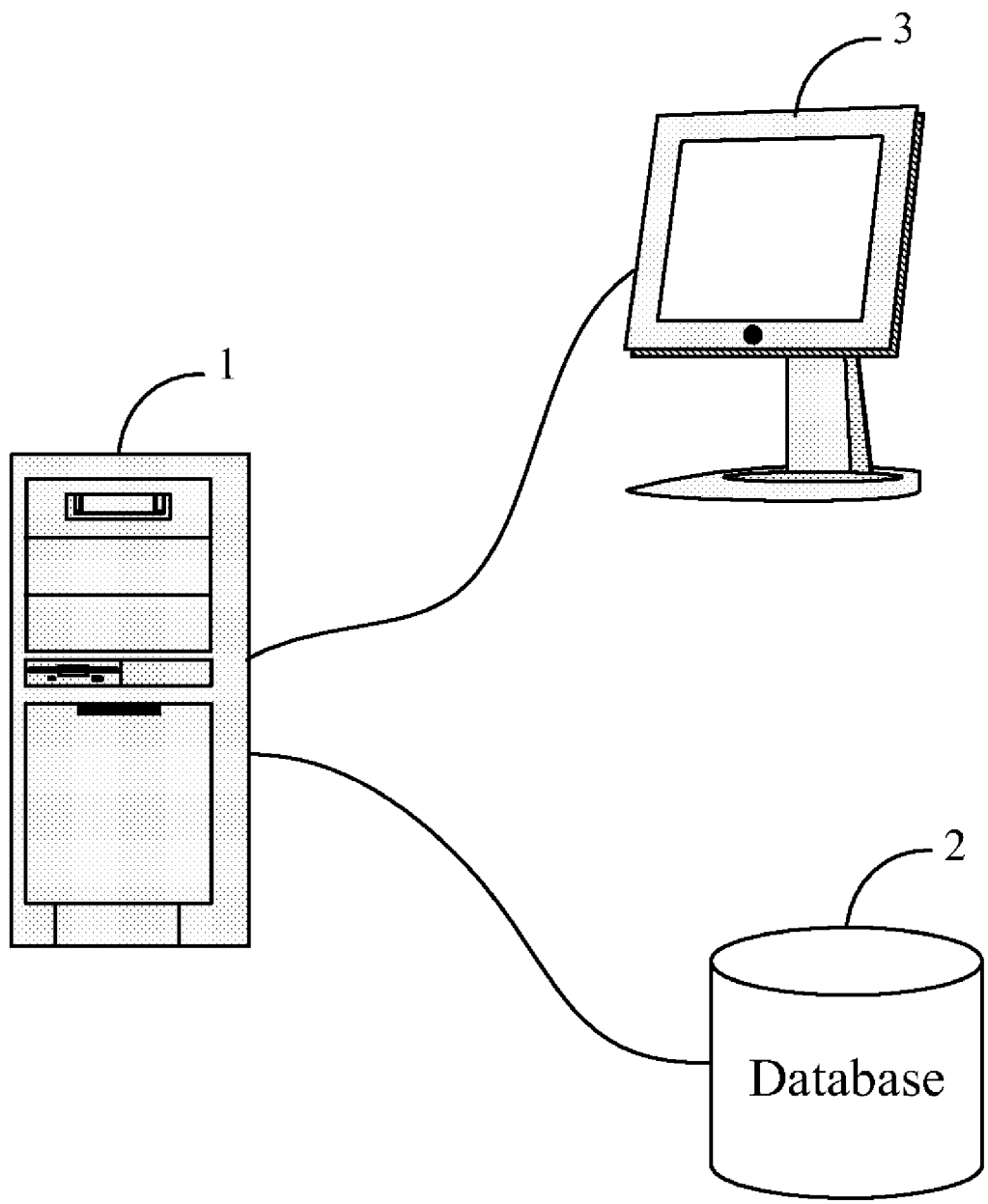
FIG. 1 is a schematic diagram of a system for controlling a workflow process in accordance with one embodiment.

FIG. 1 is a schematic diagram of a system for monitoring a workflow process (hereinafter, "the system") in accordance with one embodiment. The system typically includes an application server 1, a database 2, and a client computer 3. The application server 1 is configured for querying data of a workflow process stored in the database 2, sending an alarm signal to the client computer 3 according to queried data, and displaying a reminder message on the client computer 3 according to the alarm signal, thereby reminding to perform a step/procedure/task of the workflow process. In a preferred embodiment, tasks of the workflow process are performed manually at the client computer 3. The database 2 can be configured in, but not limited to, the application server 1. The database 2 is configured for storing task data of the workflow process. The task data include a task ID, task status, an operator ID (such as an operator name), and a task assigned time of each of the tasks of the workflow process. The task status of each of the tasks of the workflow process comprises or includes an incomplete state or a complete state. The task assigned time is a time stamp that the task was initially assigned to be performed. The client computer 3 also provides a graphical user interface for displaying the task data of the workflow process.

Figure 2:
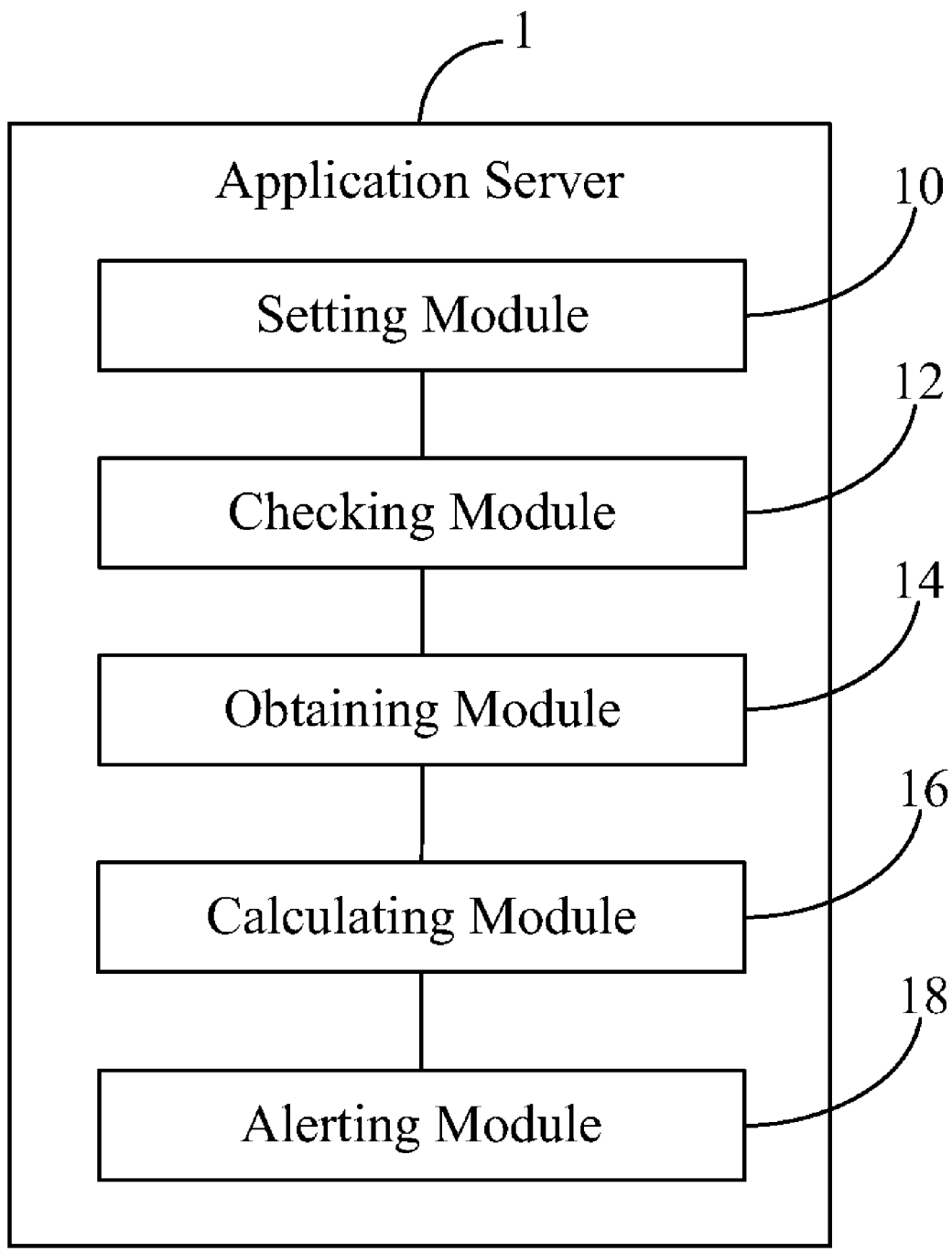
FIG. 2 is a schematic diagram of software function modules of an application server of FIG. 1.

FIG. 2 is a schematic diagram of software function modules of the application server 1. The application server 1 mainly includes a setting module 10, a checking module 12, an obtaining module 14, a calculating module 16, and an alerting module 18.

The setting module 10 is configured for setting a work schedule, a check-status schedule, and a reminder timer for each of the tasks of the workflow process, and for recording the work schedule, the check-status schedule, and the reminder timer of each of the tasks in the database 2. The work schedule consists of working hours. For example, if the setting module 10 sets the working hours of the work schedule of an exemplary task to be from "8:00 a.m." to "12:00 a.m." and from "1:30 p.m." to "5:30 p.m.," the exemplary task can only be performed during the working hours as described, and not during any non-working hours (e.g., 12:30 a.m.). In the preferred embodiment, the check-status schedule is a time interval setting when the checking module 12 queries the application server 1 for the task status of each of the tasks. In another example, the check-status schedule can be set to a ten minute interval. The reminder timer is a minimum time interval that allows each of the tasks to remain in the incomplete state before generating the alarm signal and displaying the reminder message. For example, if the setting module 10 sets the reminder timer of a particular task to be four hours, the application server 1 would send the alarm signal to the client computer 3 if the particular task has remained in the incomplete state for four hours or more than four hours, thus reminding that the particular task needs to be performed.

The checking module 12 determines whether to query data of the workflow process from the database 2 according to a current time and the check-status schedule, and then determines whether the current time is within the working hours. If the current time is within the working hours, the checking module 12 determines whether the any task is in the incomplete state by reading the task status of each of the tasks in the database 2 according to the check-status schedule. For example, if the check-status schedule is set to ten minutes interval and the work schedule is from "8:00 a.m." to "12:00 a.m.," the checking module 12 checks each of the tasks of the workflow process in the database 2 every ten minutes, such as "8:10 a.m.," "8:20 a.m.," "8:30 a.m." and so on.

The obtaining module 14 is configured for obtaining the task data of all the tasks that are in the incomplete state (described as incomplete tasks below) from the database 2. The task data include the task ID, the task status, the operator ID, and the task assigned time of the incomplete tasks.

The calculating module 16 is configured for calculating a time difference between the current time and the task assigned time of the incomplete task. To determine whether the alerting module 18 should generate the alarm signal, the calculating module 16 needs to calculate a remainder after the time difference is divided by the reminder timer by utilizing modular arithmetic, and the checking module 12 needs to determine whether the remainder is greater than zero and not greater than the check-status schedule. For instance, if the task assigned time is "10:33 a.m.," the current time is "4:10 p.m." that is within the check-status schedule, and the working hours is from "8:00 a.m." to "12:00 a.m." and from "1:30 p.m." to "5:30 p.m.," the calculating module 16 calculates the time difference by adding a first difference between the "10:33 a.m." and the "12:00 a.m." to a second difference between "1:30 p.m." and "4:10 p.m.". That is, the time difference calculated by the calculating module 16 is "247 minutes". If the check-status schedule is set to be ten minutes interval and the remainder timer is "4 hours" (240 minutes), the checking module 12 would query the application server 1 at "4:10 p.m.," the calculating module 16 needs to calculate the remainder of "247 mod 240", which is "7 minutes". The checking module 12 determines that "7 minutes" is greater than zero and not greater than the check-status schedule. The alert module 18 generates the alarm signal and sends the alarm signal to the client computer 3, and displays the reminder message on the client computer 3 reminding to complete the incomplete task according to the alarm signal in the current time "4:10 p.m.".

In the preferred embodiment, if the check-status schedule is ten minutes, the time difference is "247 minutes" and the remainder timer is "5 hours" (300 minutes), the remainder of "247 mod 300" is "247 minutes," the alerting module 18 would not generate the alarm signal at the current time because the checking module 12 determines that the remainder "247 minutes" is greater than ten minutes.

Figure 3:
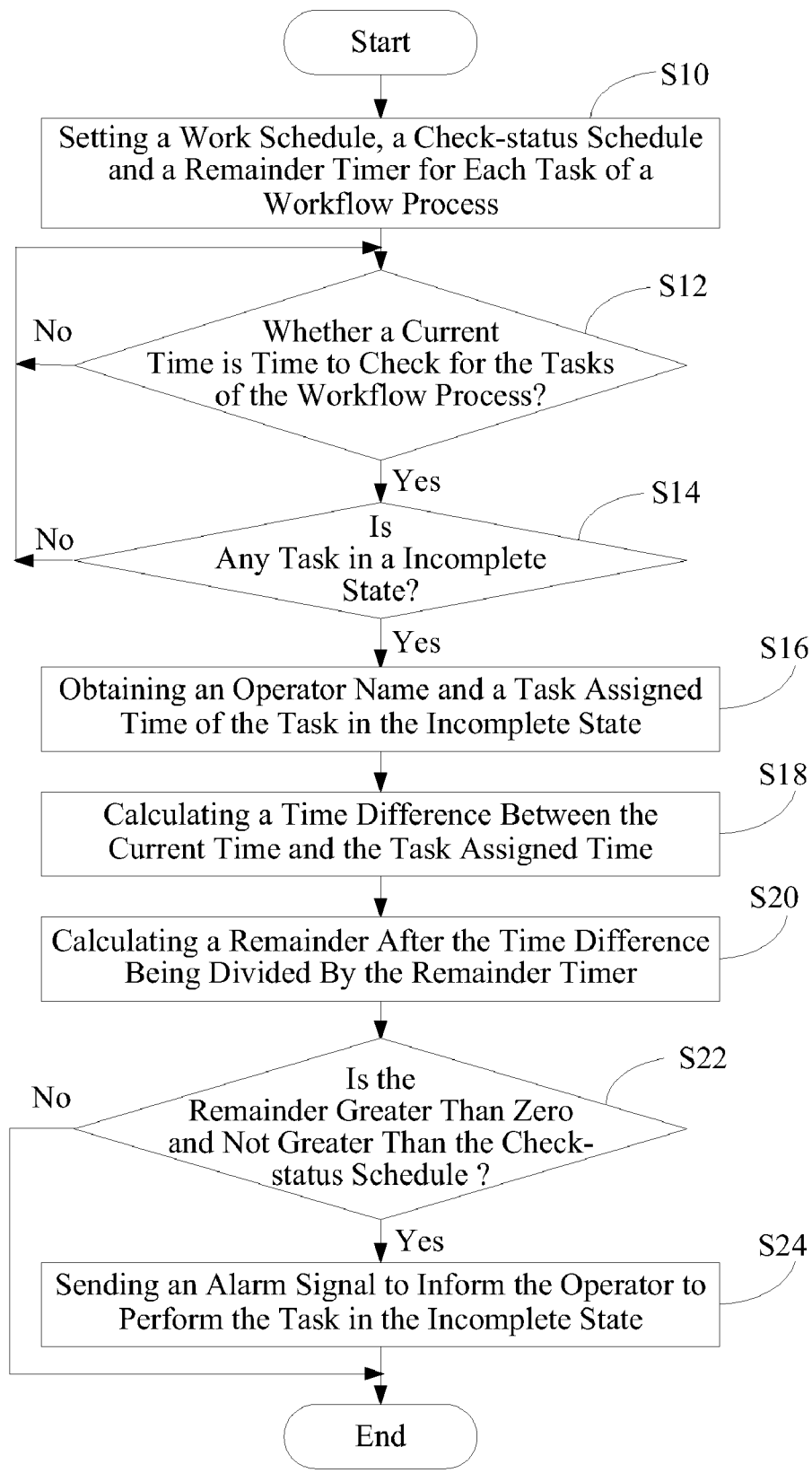
FIG. 3 is a flowchart of a preferred method for controlling a workflow process in accordance with another embodiment.

FIG. 3 is a flowchart of a preferred method for controlling a workflow process in accordance with another embodiment. In step S10, the setting module 10 sets the work schedule, the check-status schedule and the reminder timer for each of the tasks of the workflow process.

In step S12, the checking module 12 determines whether the current time is time to check for the tasks of the workflow process according to the check-status schedule and the work schedule in the database 2.

If the current time is the time to check for the tasks of the workflow process, in step S14, the checking module 12 determines whether any one of the tasks of the workflow process is in the incomplete state by checking the task status of each of the tasks in the database 2 according to the check-status schedule. Otherwise, if the current time is not the time to check for the tasks of the workflow process, the procedure returns step S12 described above. For example, the setting module 10 sets the check-status schedule being ten minutes, the checking module 12 checks each of the tasks of the workflow process in the database 2 every time interval of the check-status schedule, such as "8:10 a.m.", "8:20 a.m.", "8:30 a.m.", . . . "12:10 a.m.", "12:20 a.m.", and so on, if the setting module 10 sets the work schedule being from "8:00 a.m." to "12:00 a.m.", the checking module 12 would not check each of the tasks of the workflow process at "12:10 a.m.", "12:20 a.m.", and the other times that are not within the working schedule.

If there is an incomplete task in the workflow process, in step S16, the obtaining module 14 obtains task data of the incomplete task from the database 2. The task data include the task ID, the task status, the operator ID, and the task assigned time of the incomplete task. Otherwise, if there is no incomplete task in the workflow process, the procedure returns step S12 described above.

In step S18, the calculation module 16 calculates a time difference between the current time and the task assigned time of the incomplete task.

In step S20, the calculating module 16 calculates a remainder after the time difference is divided by the reminder timer by utilizing the modular arithmetic. For example, if the time difference is "247 minutes" and the reminder timer is "4 hours" (240 minutes), the remainder of "247 mod 240" is "7 minutes"; if the time difference is "247 minutes" and the reminder timer is "5 hours" (300 minutes), the remainder of "247 mod 300" is "247 minutes".

In step S22, the checking module 12 determines whether the remainder is greater than zero and not greater than the check-status schedule. If the remainder is greater than zero and not greater than the check-status schedule, in step S24, the alerting module 18 generates an alarm signal and sends the alarm signal to inform the corresponding operator to perform the incomplete task, and displays a reminder message on the client computer 3 according to the alarm signal. Otherwise, if the remainder is greater than the check-status schedule or is less than zero, the procedure directly ends.

In the other preferred embodiment, the checking module 12 can also query data of the workflow process in non working hours, and the alerting module 18 can transmit the reminder message to the client computer 3 to inform the operator to perform the incomplete task by utilizing the other manner such as an email.

It is to be understood, however, that even though numerous characteristics and advantages of the indicated invention have been set forth in the foregoing description, together with details of the structure and function of the invention, the disclosure is illustrative only and changes may be made in details, especially in matters of shape, size and arrangement of parts within the principles of the invention to the full extent indicated by the broad general meaning of the terms in which the appended claims are expressed.

What is claimed is:

1. A system for monitoring a workflow process configured in an application server, the application server being connected to a database, which is configured for storing task status, an operator name, and a task assigned time of each task of the workflow process, the application server comprising:
    a setting module configured for setting working hours of a work schedule and a time interval for querying the application server for the task status of each task, setting a minimum time interval that allows the task to remain in an incomplete state for each task of the workflow process, and recording the working hours, the time interval and the minimum time interval into the database;
    a checking module configured for computing querying times for querying the application server according to the time interval, and determining whether any task of the workflow process is in the incomplete state during the working hours by checking the task status of each task of the workflow process according to the querying times;
    an obtaining module configured for obtaining from the database the operator name and the task assigned time of the task remained in the incomplete state;
    a calculation module configured for calculating a time difference between a current time and the task assigned time of the task remained in the incomplete state if the current time is one of the querying times, and calculating a remainder after the time difference being divided by the minimum time interval by utilizing modular arithmetic; and
    an alerting module configured for generating an alarm signal and sending the alarm signal to inform an operator corresponding to the operator name to perform the task remained in the incomplete state if the remainder is greater than zero and not greater than the time interval.

2. The system for monitoring a workflow process as described in claim 1, wherein the minimum time interval is a time interval that allows the task to remain in the incomplete state before generating the alarm signal.

3. The system for monitoring a workflow process as described in claim 1, wherein the database is further configured for storing a task ID of each task of the workflow process.

4. A computer-enabled method for monitoring a workflow process, the method comprising:
    setting working hours of a work schedule, a time interval for querying an application server for task status of tasks and a minimum time interval that allows the task to remain in an incomplete state for each task of the workflow process;
    computing querying times for querying the application server for the task status of each task according to the time interval;
    checking whether any task of the workflow process is in an incomplete state during the working hours if a current time is one of the querying times;
    obtaining an operator name and a task assigned time of the task remained in the incomplete state;
    calculating a time difference between the current time and the task assigned time and calculating a remainder after the time difference being divided by the minimum time interval by utilizing modular arithmetic;
    determining whether the remainder is greater than zero and not greater than the time interval; and
    generating an alarm signal and sending the alarm signal to inform an operator corresponding to the operator name to perform the task remained in the incomplete state if the remainder is greater than zero and not greater than the time interval.

5. The method for monitoring a workflow process as described in claim 4, further comprising steps of:
    returning to the step of determining whether the current time is one of the querying time if each task of the workflow process is not in the incomplete state.

\* \* \* \* \*